(12) United States Patent
Schreiner et al.

(10) Patent No.: US 8,402,878 B2
(45) Date of Patent: Mar. 26, 2013

(54) AXLE ASSEMBLY

(75) Inventors: Matthew A. Schreiner, Omro, WI (US);
Steven R. Roehl, Menasha, WI (US);
David J. Pelko, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 86 days.

(21) Appl. No.: 12/885,039

(22) Filed: Sep. 17, 2010

(65) Prior Publication Data
US 2011/0169240 A1 Jul. 14, 2011

Related U.S. Application Data

(60) Provisional application No. 61/277,982, filed on Oct. 1, 2009.

(51) Int. Cl.
*F41H 5/06* (2006.01)
*B60J 11/06* (2006.01)
(52) U.S. Cl. ............... 89/36.08; 89/36.07; 89/36.09; 89/918; 296/187.07
(58) Field of Classification Search .......... 89/36.07, 89/36.08, 36.09; 280/507, 770; 180/346; 296/187.07
See application file for complete search history.

(56) References Cited

U.S. PATENT DOCUMENTS

| | | | | |
|---|---|---|---|---|
| 3,039,788 A * | 6/1962 | Farago | .................. | 280/124.142 |
| 3,395,672 A * | 8/1968 | Ruf | .................. | 440/12.6 |
| 4,655,307 A * | 4/1987 | Lamoureux | .................. | 180/69.1 |
| 5,327,989 A | 7/1994 | Furuhashi et al. | | |
| 5,752,862 A * | 5/1998 | Mohler et al. | .................. | 440/38 |
| 5,905,225 A * | 5/1999 | Joynt | .................. | 89/36.02 |
| 5,915,728 A * | 6/1999 | Blackburn | .................. | 280/847 |
| 5,954,364 A | 9/1999 | Nechushtan | | |
| 6,131,685 A | 10/2000 | Sakamoto et al. | | |
| 6,357,769 B1 | 3/2002 | Omundson et al. | | |
| 6,435,071 B1 * | 8/2002 | Campbell | .................. | 180/41 |
| 6,435,298 B1 * | 8/2002 | Mizuno et al. | .................. | 180/346 |
| 6,460,907 B2 | 10/2002 | Usui | | |
| 6,516,914 B1 | 2/2003 | Andersen et al. | | |
| 6,623,020 B1 | 9/2003 | Satou | | |
| 6,692,366 B1 | 2/2004 | Savant | | |
| 6,702,058 B2 | 3/2004 | Ishii et al. | | |
| 6,925,735 B2 | 8/2005 | Hamm et al. | | |
| 7,144,039 B2 | 12/2006 | Kawasaki et al. | | |
| 7,188,893 B2 | 3/2007 | Akasaka | | |
| 7,306,069 B2 | 12/2007 | Takeshima et al. | | |

(Continued)

FOREIGN PATENT DOCUMENTS

JP 4230421 8/1992
JP 06-037090 5/1994

(Continued)

OTHER PUBLICATIONS

International Search Report and Written Opinion for International Application No. PCT/US10/50913, mail date Aug. 5, 2011, 11 pages.

*Primary Examiner* — Bret Hayes
(74) *Attorney, Agent, or Firm* — Foley & Lardner LLP

(57) ABSTRACT

An axle assembly of a vehicle includes a side plate, a wheel end assembly, and a lower control arm. The side plate is part of a support structure of the vehicle, and the lower control arm extends between the side plate and the wheel end assembly. A spring member and a damper are each connected between the lower control arm and the side plate. The axle assembly further includes a shield fixed to the lower control arm, where the shield is designed to at least partially protect the vehicle from an explosive blast originating below the vehicle.

13 Claims, 21 Drawing Sheets

U.S. PATENT DOCUMENTS

| | | |
|---|---|---|
| 7,377,549 B2 | 5/2008 | Hasegawa et al. |
| 7,393,016 B2 | 7/2008 | Mitsui et al. |
| 7,441,615 B2 | 10/2008 | Borroni-Bird et al. |
| 7,510,235 B2 | 3/2009 | Kobayashi et al. |
| 7,618,063 B2 | 11/2009 | Takeshima et al. |
| 7,624,835 B2 | 12/2009 | Bowers |
| 7,699,385 B2 | 4/2010 | Kurata |
| 7,726,429 B2 | 6/2010 | Suzuki |
| 7,757,805 B2 | 7/2010 | Wakuta et al. |
| 7,802,816 B2 | 9/2010 | McGuire |
| 7,997,182 B1 | 8/2011 | Cox |
| 8,029,021 B2 | 10/2011 | Leonard et al. |
| 8,033,208 B2 | 10/2011 | Joynt et al. |
| 8,146,477 B2 | 4/2012 | Joynt |
| 8,146,478 B2 | 4/2012 | Joynt et al. |
| 2002/0190516 A1 | 12/2002 | Henksmeier et al. |
| 2007/0102963 A1 | 5/2007 | Frederick et al. |
| 2007/0234896 A1 | 10/2007 | Joynt |
| 2008/0017434 A1 | 1/2008 | Harper et al. |
| 2008/0034953 A1 | 2/2008 | Barbe et al. |
| 2008/0066613 A1 | 3/2008 | Mills et al. |
| 2009/0001761 A1 | 1/2009 | Yasuhara et al. |
| 2009/0061702 A1* | 3/2009 | March ................ 440/12.52 |
| 2010/0026046 A1 | 2/2010 | Mendoza et al. |
| 2010/0032932 A1 | 2/2010 | Hastings |
| 2010/0187864 A1 | 7/2010 | Tsuchida |
| 2010/0218667 A1 | 9/2010 | Naroditsky et al. |
| 2010/0264636 A1* | 10/2010 | Fausch et al. ................ 280/770 |
| 2011/0068606 A1 | 3/2011 | Klimek et al. |
| 2012/0049570 A1 | 3/2012 | Aizik |

FOREIGN PATENT DOCUMENTS

| | | |
|---|---|---|
| JP | 2005-007995 | 1/2005 |
| JP | 2005-212698 | 8/2005 |
| JP | 2006-056463 | 3/2006 |

* cited by examiner

AXLE ASSEMBLY

CROSS-REFERENCE TO RELATED APPLICATIONS

This application claims the benefit of U.S. Provisional Application No. 61/277,982, filed Oct. 1, 2009, which is incorporated herein by reference in its entirety.

BACKGROUND

The present invention relates generally to the field of vehicle axle assemblies. More specifically, the present invention relates to an axle assembly designed to manage high bursts of energy, such as the energy produced by a landmine explosion.

An axle assembly for a vehicle may include all or portions of a number of vehicle systems, such as a suspension system, a drive train, wheel-end components, and other systems. Proper functioning of any or all of the systems of an axle assembly may be important for the proper functioning of the vehicle. However, in a hostile environment the systems of the axle assembly may become targets of attack. As such, landmines and improvised explosive devices (IEDs) may be debilitating to the vehicle, by damaging the axle assembly.

During a blast event, explosive energy produced beneath the vehicle may travel around and through components of the undercarriage of the vehicle, to the hull of the vehicle. Explosive energy reaching the hull is then either absorbed and/or directed away therefrom. However, in some instances, some of the explosive energy may not reach the hull. Instead the explosive forces may be absorbed by components of the undercarriage, such as the axle assembly, damaging the vehicle by destroying the components and/or by catching the components and lifting the vehicle off the ground, such that upon crashing down the vehicle is further harmed.

SUMMARY

One embodiment of the invention relates to an axle assembly of a vehicle. The axle assembly includes a side plate, a wheel end assembly, and a lower control arm. The side plate is part of a support structure of the vehicle, and the lower control arm extends between the side plate and the wheel end assembly. A spring member and a damper are each connected between the lower control arm and the side plate. The axle assembly further includes a shield fixed to the lower control arm, where the shield is designed to at least partially protect the vehicle from an explosive blast originating below the vehicle.

Another embodiment of the invention relates to a suspension system for an axle assembly of a vehicle. The suspension system includes a lower control arm, a spring member, a damper, and a shield. The spring member and the damper are each connected to the control arm. The shield is also connected to the lower control arm, and includes a first surface area and a second surface area. The first surface area is designed to receive at least a portion of an explosive blast originating below the vehicle such that energy of the blast is directed to the lower control arm, absorbed by the spring, and dissipated by the damper. The second surface area is designed to direct at least a portion of the blast away from the vehicle in a direction transverse to the vehicle.

Yet another embodiment of the invention relates to a system for shielding an under portion of a vehicle. The system includes an axle assembly having a lower control arm and a canister. A first shield is fastened to the lower control arm, and a second shield is fastened to the canister. The first and second shields each include at least one angled surface that is designed to redirect an upwardly directed explosive blast in a direction that is transverse to the vehicle.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
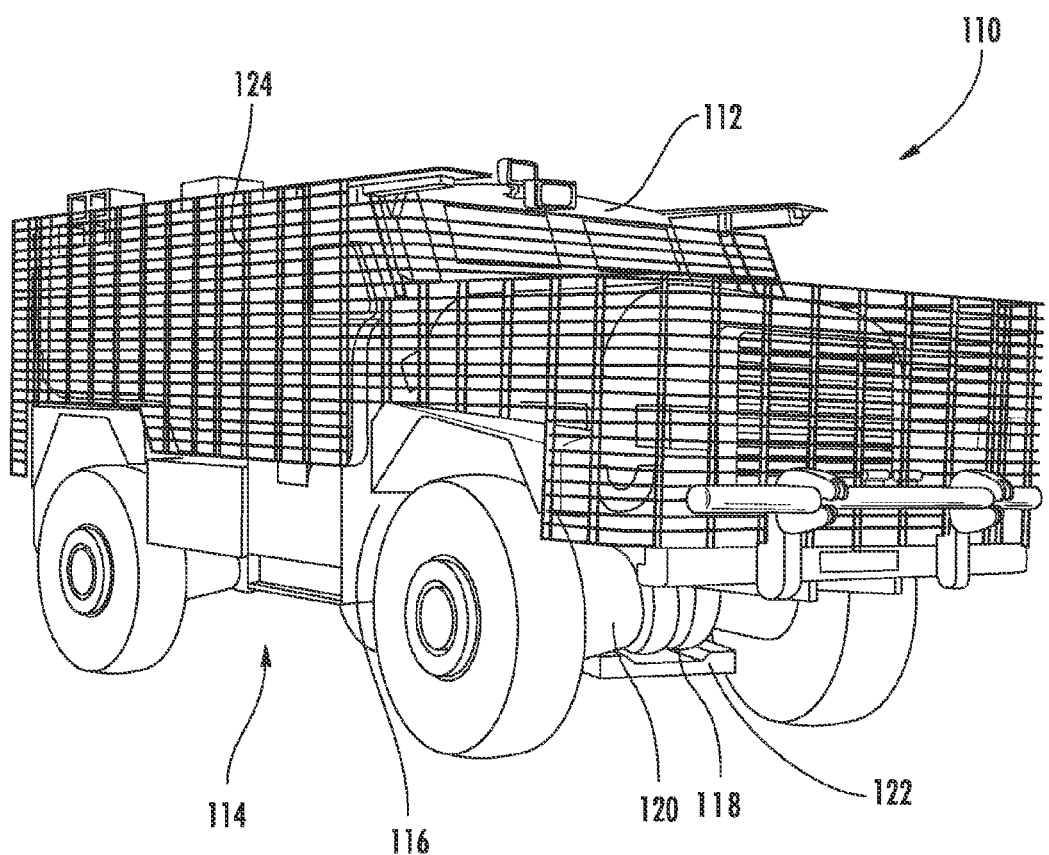
FIG. 1 is a perspective view of a vehicle according to an exemplary embodiment.
Figure 2:
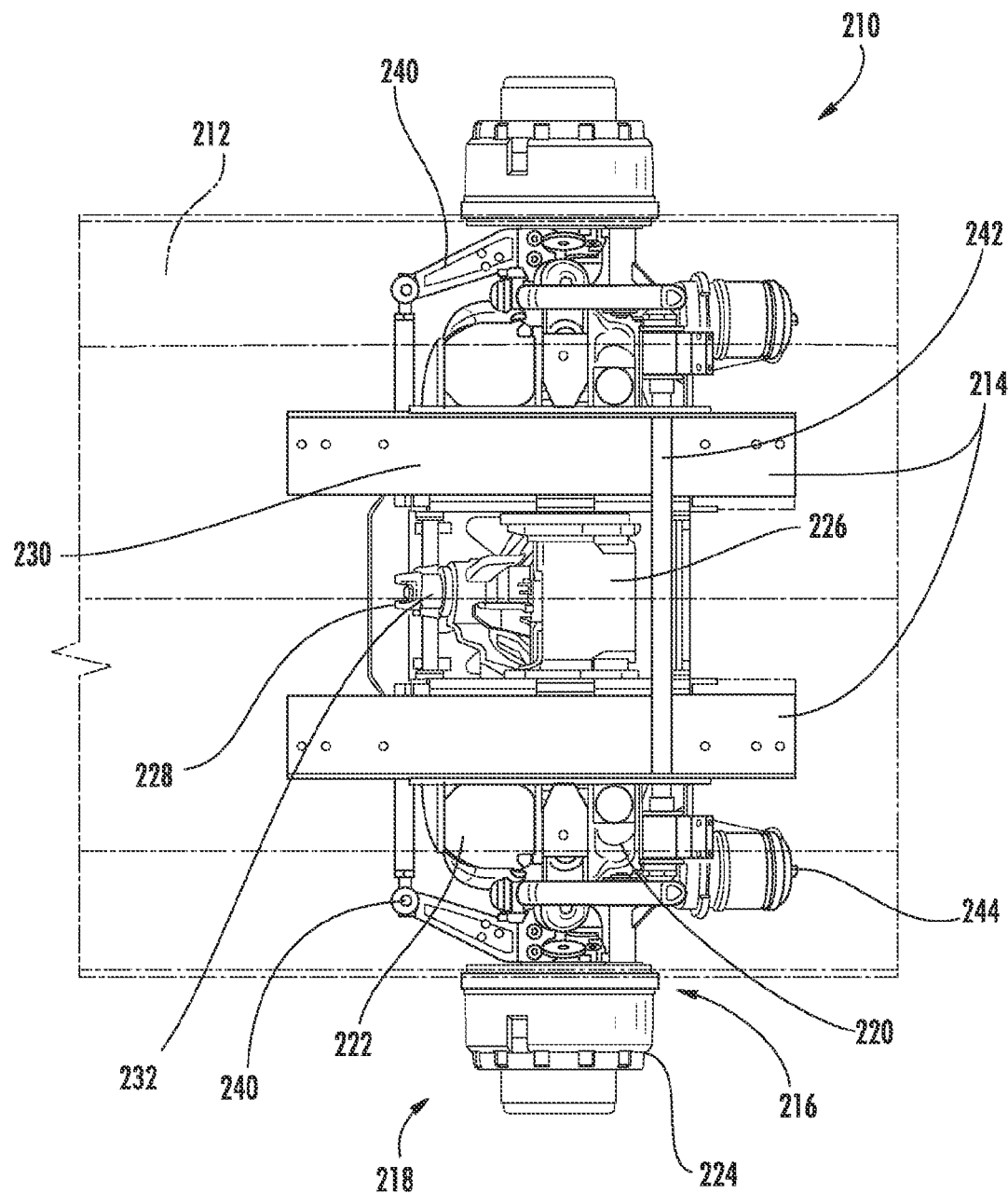
FIG. 2 is a top view of an axle assembly according to an exemplary embodiment.
Figure 3:
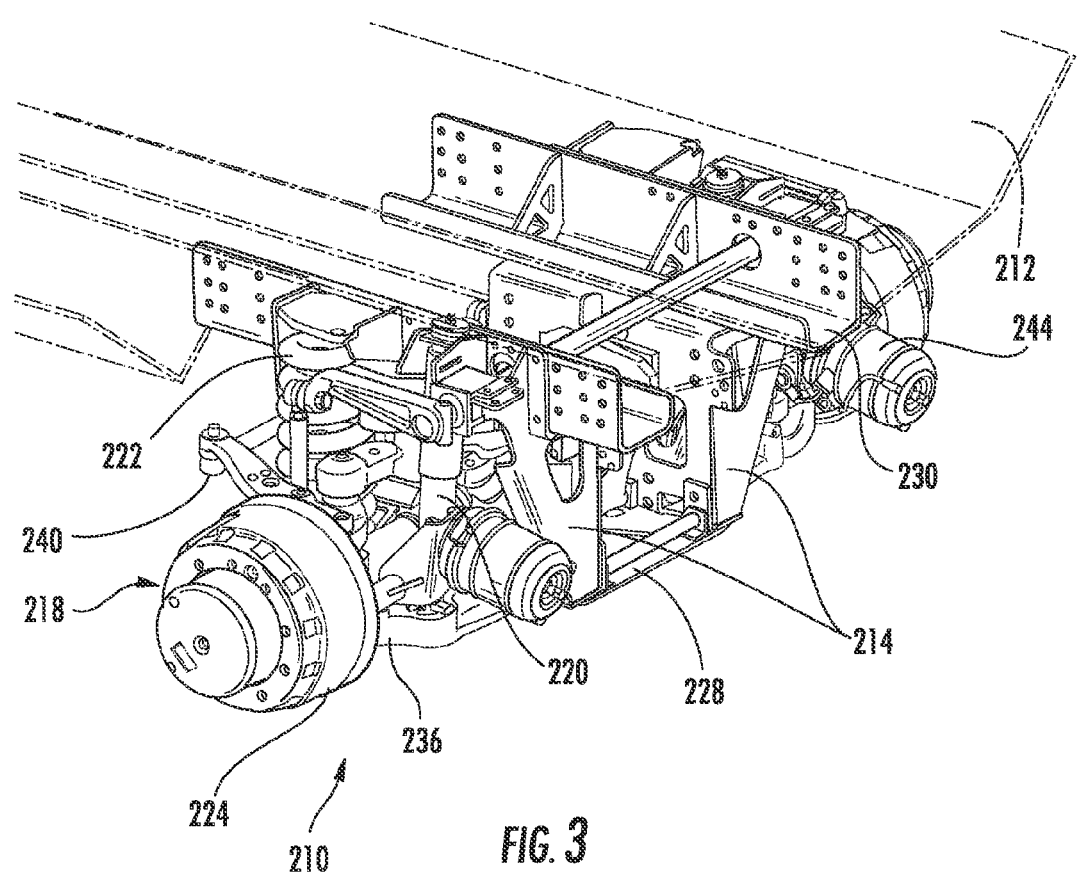
FIG. 3 is a perspective view of the axle assembly of FIG. 2.
Figure 4:
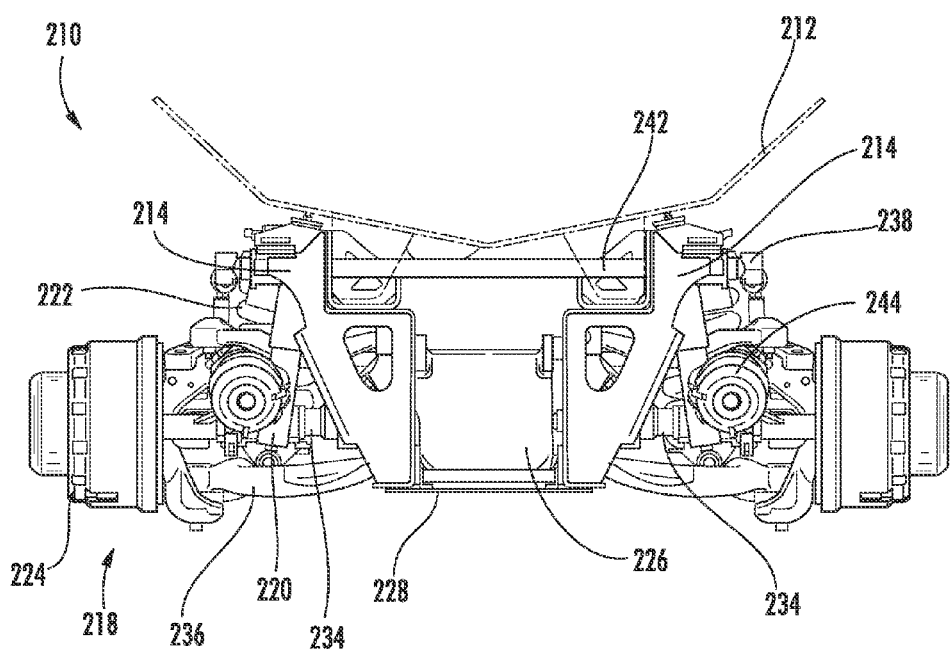
FIG. 4 is a front view of the axle assembly of FIG. 2.
Figure 5:
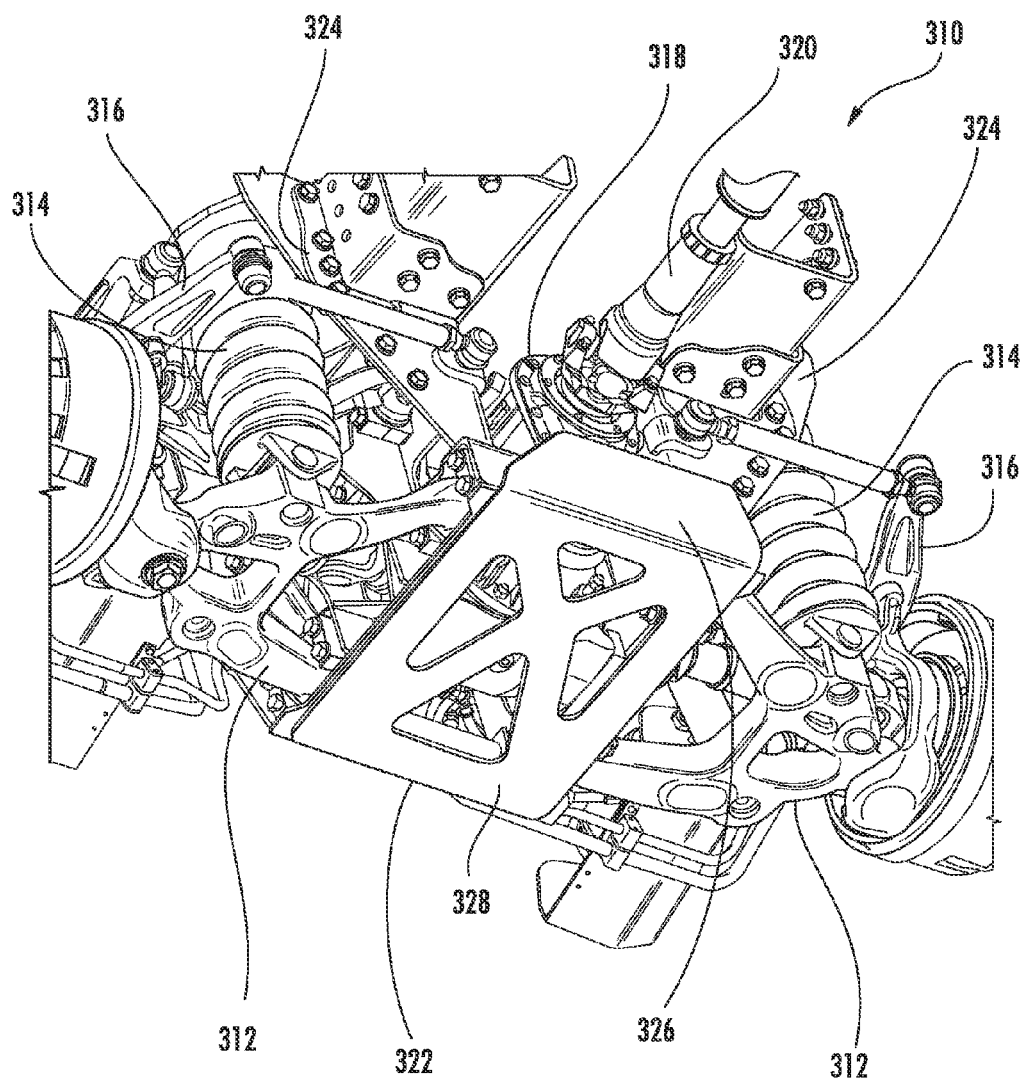
FIG. 5 is a perspective view of an axle assembly according to another exemplary embodiment.
Figure 14:
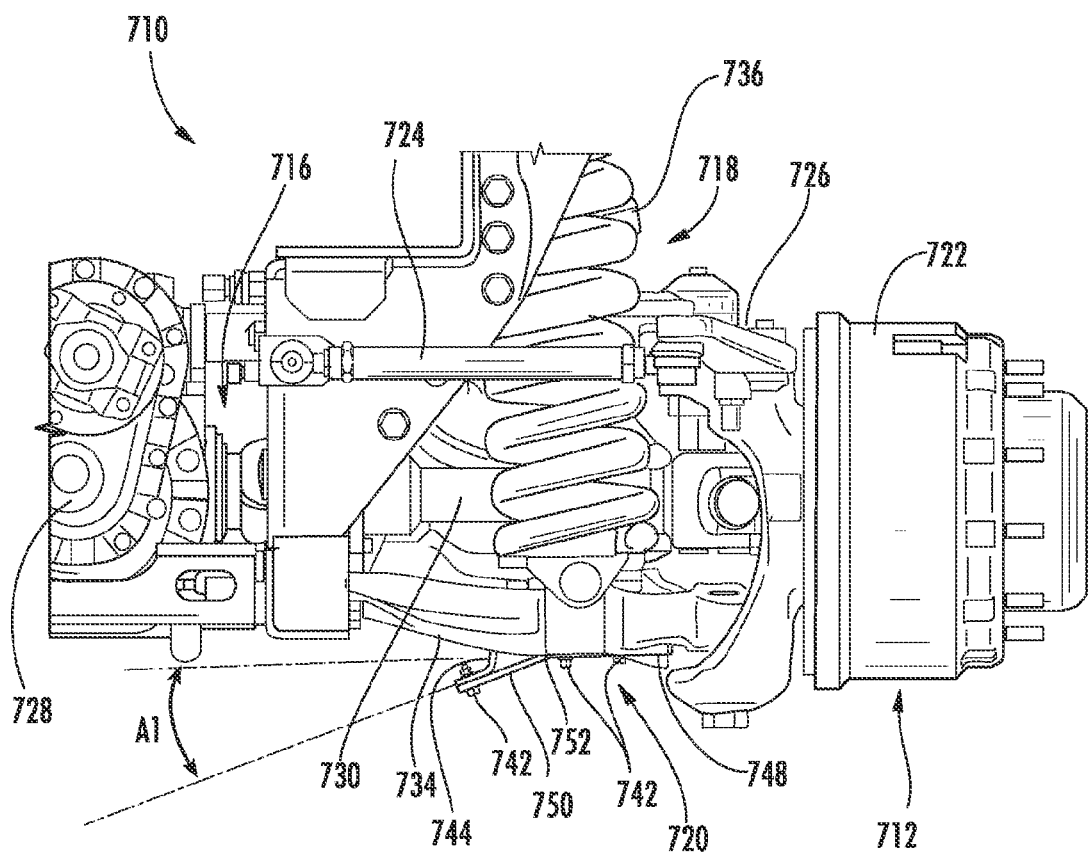
FIG. 14 is a front view of the first portion of the axle assembly of FIG. 13.
Figure 15:
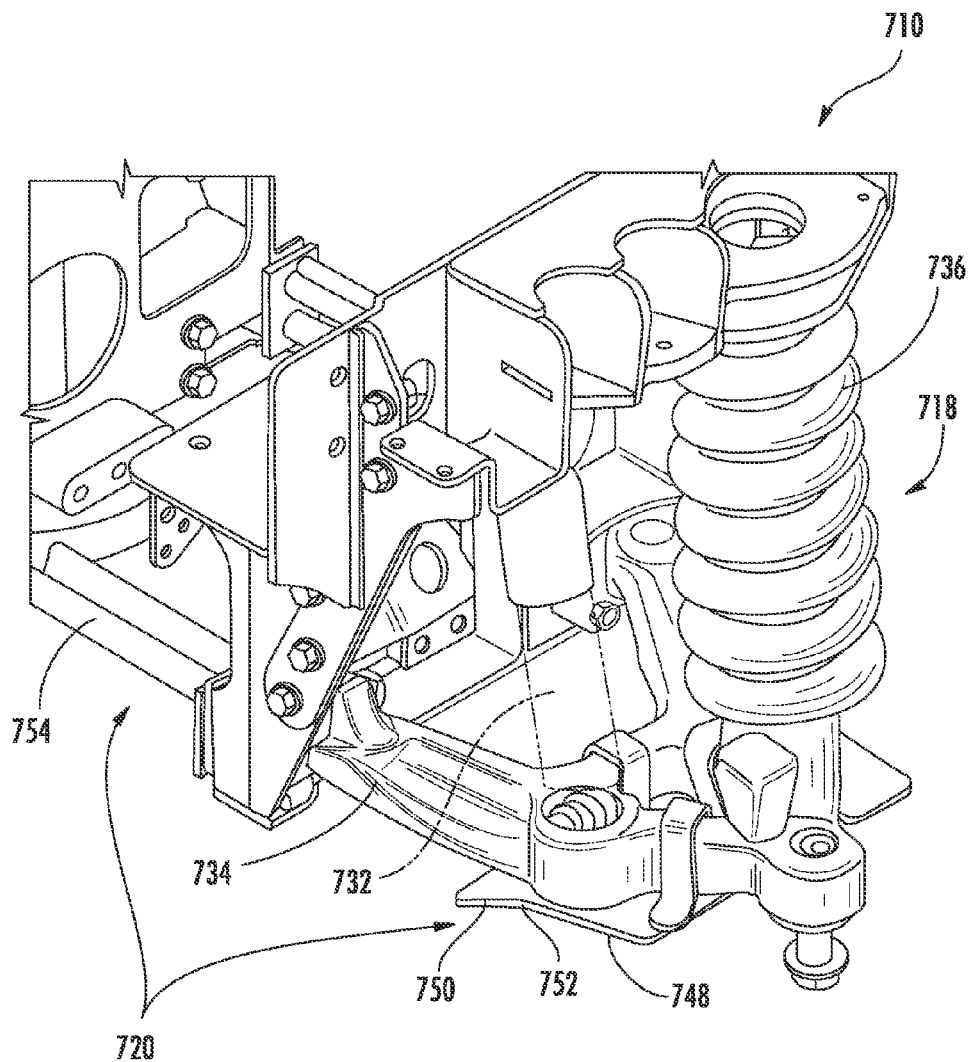
FIG. 15 is a perspective view of the second portion of the axle assembly of FIG. 13.
Figure 16:
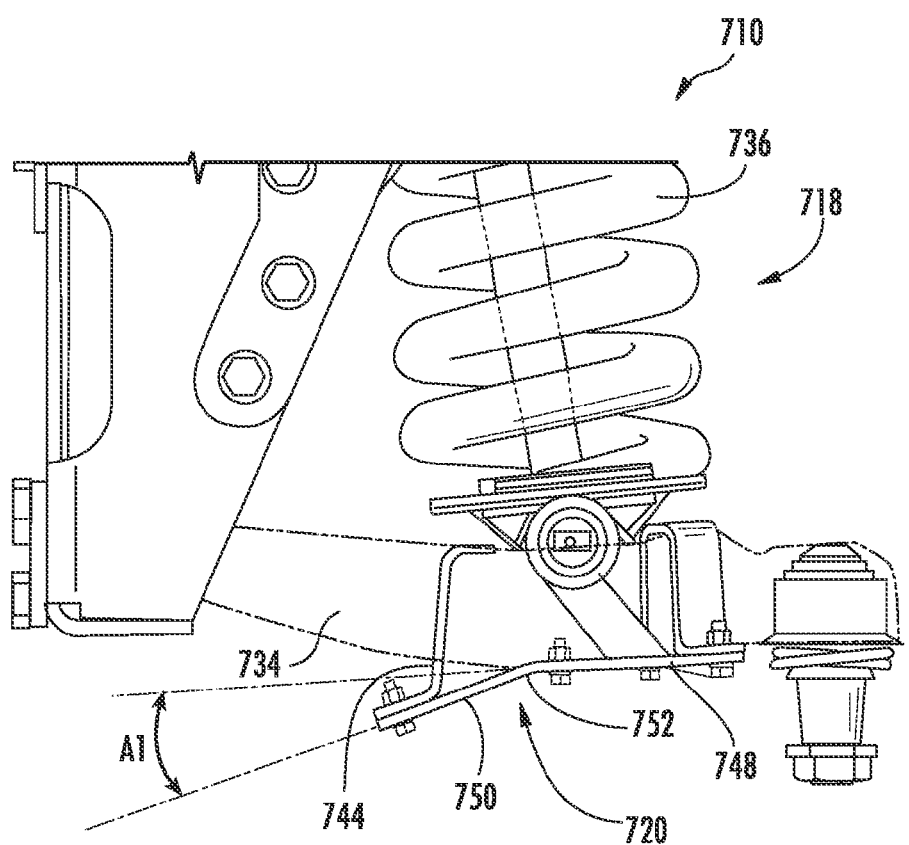
FIG. 16 is a front view of the second portion of the axle assembly of FIG. 13.

Referring to FIG. 1, a heavy vehicle 110 includes a cabin 112 (e.g., cab, housing) having an undercarriage 114 therebelow. The undercarriage includes an underside of hull 116 (see, e.g., hull 212 as shown in FIGS. 2-4), such as a blast resistant hull, which is supported by an axle assembly 118. The vehicle further includes a prime mover (e.g., diesel engine, gasoline engine, electric motor, etc.) powering a drive train (e.g., driveline). The drive train includes a transmission, a driveshaft (see, e.g., driveshaft 320 as shown in FIG. 5) rotatably coupled to a differential (see, e.g., differential 414 as shown in FIGS. 6-9), which is supported by the axle assembly 118. The axle assembly 118 further includes a suspension system 120 (see also suspension system 718 as shown in FIGS. 14-16), portions of the drive train (see, e.g., differential 414 and half shafts 438 extending therefrom, as shown in FIGS. 6-9), and a skid plate 122, among other components.

According to an exemplary embodiment, the axle assembly 118 is designed to survive a blast from an IED or a landmine by allowing explosive energy of the blast to pass around components of the axle assembly 118, and/or to absorb, deflect, and dissipate the blast by the hull 116 of the vehicle 110. In some embodiments, the vehicle 110 is a military vehicle such as a mine resistant ambush protected (MRAP) vehicle, where the cabin 112 is surrounded by a grate 124 (e.g., shielding, barrier). In other contemplated embodiments, the vehicle may be one of a broad range of vehicles (e.g., semi truck, construction equipment, troop transport, aircraft, amphibious vehicle, etc.), having a structure designed to mitigate harm caused by an explosive blast directed toward the undercarriage of the vehicle. Contemplated embodiments include independent suspension, partially-independent suspension (e.g., independent front suspension, independent rear suspension), beam axles, live axles, or other forms of suspension systems.

Referring to FIGS. 2-4, an axle assembly 210 for a vehicle includes side plates 214 (structure that supports control arms and/or hull), an independent suspension system 216, and wheel-end components 218. A hull 212 is mounted to the side plates 214. The independent suspension system 216 includes a shock absorber 220 (e.g., damper, cylinder), control arms 236, bumpers 238 (e.g., end stops) (FIG. 4), a spring member 222 (e.g., coil spring, leaf spring, gas spring), an anti-sway bar 242, and canisters 244. In some embodiments, the wheel-end components 218, include steering arms 240 and a hub 224 having a gear reduction (e.g., planetary gear set) and brake components generally internal thereto.

According to an exemplary embodiment, at least some of the above-described components of the axle assembly 210 may be compatible (e.g., interchangeable, substitutable) with a commercially-available TAK-4 independent suspension system produced by OSHKOSH CORPORATION, as used with fire trucks, U.S. Marine Corps Medium Tactical Vehicle Replacement (MTVR) trucks, various MRAP vehicles, and other vehicles.

A differential 226 is positioned below the hull 212, between the side plates 214, and above a skid plate 228. The differential 226 includes a coupling 232 (FIG. 2) for receiving a driveshaft (see, e.g., driveshaft 320 as shown in FIG. 5) of the vehicle, as an rotatable input thereto. The differential 226 transfers rotational motion of the driveshaft to half shafts 234 (FIG. 4) extending from the differential 226 to the wheel-end components 218. The skid plate 228 is positioned below the differential 226, and shields the differential 226.

According to an exemplary embodiment, the hull 212 is bolted or otherwise fastened to a seat 230 of the side plates 214, above the differential 226. In some embodiments, the hull 212 includes a V-shaped curvature (e.g., geometry, angled surface configuration, etc.) configured to absorb and/or redirect an explosive blast traveling upward to the hull 212 in a direction away from a cabin of the vehicle (see, e.g., cabin 112 of vehicle 110 as shown in FIG. 1). In other embodiments, the hull is otherwise shaped, such as a parabolic hull, U-shaped hull, or a flat hull.

As shown in FIG. 5, an axle system 310 includes lower control arms 312, spring members 314, steering arms 316, a differential 318 coupled to a driveshaft 320, and a skid plate 322, similar to the skid plate 228 shown in FIGS. 2-4. Side plates 324 of the axle system 310 include two parts that are bolted together—in contrast to the integral side plates 214 shown in FIGS. 2-4. The skid plate 322 may be formed generally as a tray (e.g., stamped and folded), including an upwardly folded side 326 configured to direct ground obstacles under the skid plate 322. The skid plate 322 is generally flat, defining a plane substantially parallel with the ground. Bottom surfaces 328 of the skid plate 322 would be perpendicular to an upwardly directed IED or landmine blast path, possibly catching blast energy in the skid plate 322.

Figure 6:
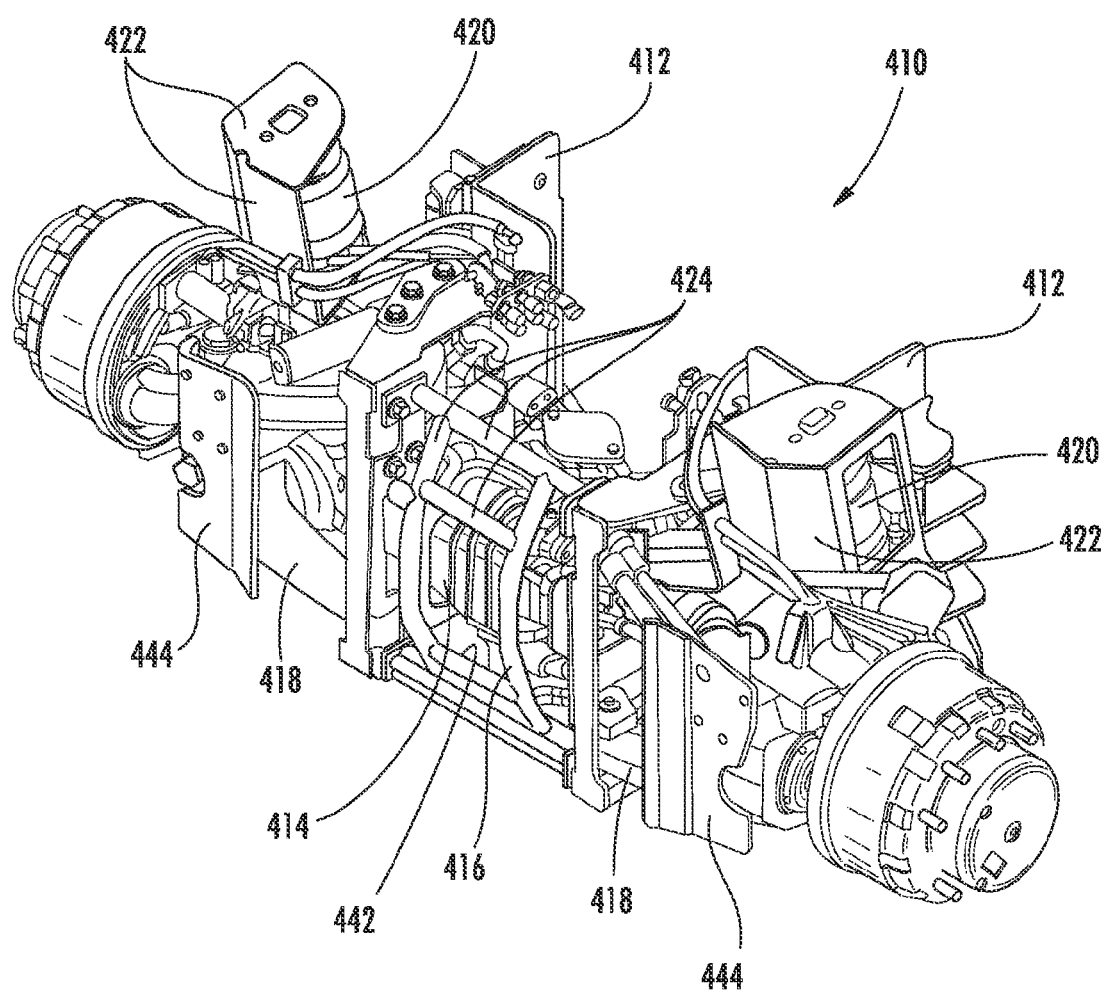
FIG. 6 is a perspective view of an axle assembly according to yet another exemplary embodiment.
Figure 7:
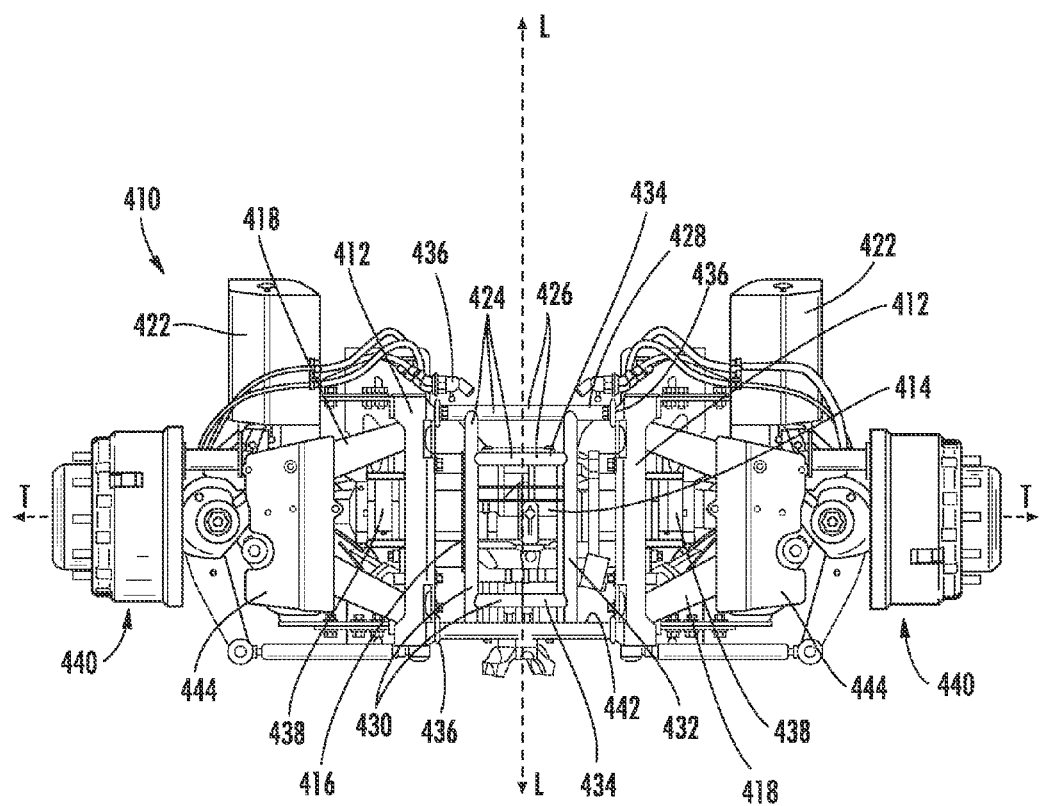
FIG. 7 is a bottom view of the axle assembly of FIG. 6.
Figure 8:
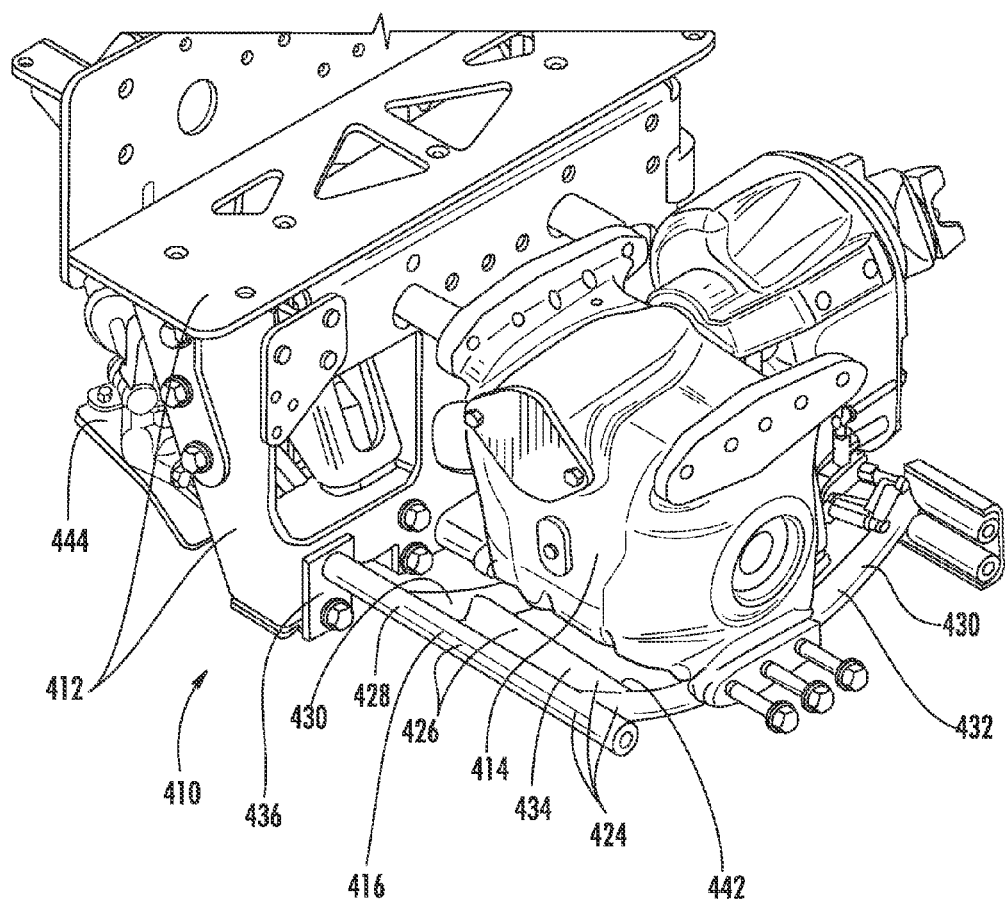
FIG. 8 is a perspective view of a portion of the axle assembly of FIG. 6.
Figure 9:
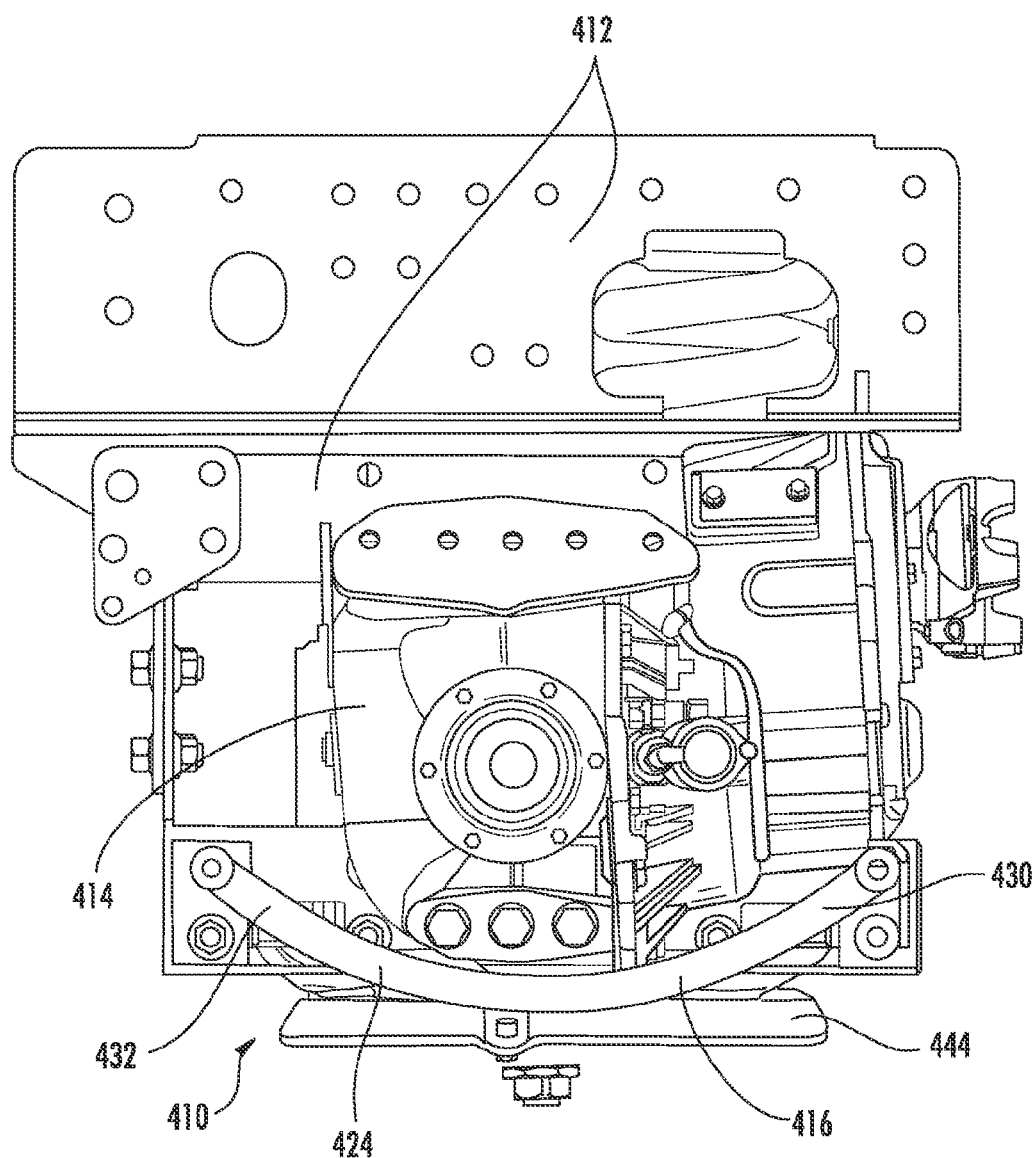
FIG. 9 is a side view of the portion of the axle assembly of FIG. 6.

Referring to FIGS. 6-9, an axle assembly 410 of a vehicle (see, e.g., vehicle 110 as shown in FIG. 1) includes side plates 412 configured to support a vehicle hull (see, e.g., hull 212 as shown in FIGS. 2-4). A differential 414 is positioned between the side plates 412 and is protected by a skid plate 416. Lower control arms 418 extend horizontally from the side plates 412, and include shields 444 fastened thereto, or formed integrally therewith. Canisters 420 (FIG. 6) proximate to the lower control arms 418 also include shielding 422. Above the lower control arms 418, half shafts 438 rotatably couple the differential 414 to wheel-end components 440 of the axle assembly 410. Referring specifically to FIGS. 8-9, one of the side plates 412 is omitted to better show sides of the differential 414 and skid plate 416.

The skid plate 416 of the axle assembly 410 is formed from an array (e.g., network, grate) of beams 424 (e.g., tubular members; solid, curved, straight beams, etc.). According to an exemplary embodiment, the beams of the array of beams 424 are interconnected, such as with one beam fastened to (e.g., welded to, formed with, etc.) another beam, and/or with each beam fastened to at least one other beam. In some embodiments, the beams are steel, iron, or another high-strength metal having a high toughness value. In at least one embodiment, the beams are individually cast and welded together; and in other embodiments, the array of beams 424 is integrally cast.

It is contemplated that the beams may have round, square, rectangular, flat, oval or other cross-sectional shapes, or combinations of shapes. In some embodiments the beams are solid, while in other embodiments, the beams may be hollow. In contemplated embodiments, the maximum distance that any beam of the array of beams 424 extends between the side plates 412, along the transverse axis of the vehicle, is greater than twice the maximum cross section of any beam of the array of beams 424.

According to an exemplary embodiment, the array of beams 424 includes a first set of beams 426 extending generally parallel with the half shafts 438 of the axle assembly 410 (e.g., less than a 20-degree relative angle therebetween, less than 10-degrees, less than 5-degrees), such as generally along a transverse axis T (FIG. 7) of the vehicle. One or more beams 428 (e.g., at least two beams) of the first set of beams 426 are fastened to the side plates 412. In some embodiments, some or all beams of the first set of beams 426 are substantially straight.

The array of beams 424 further includes a second set of beams 430 extending generally parallel with a driveshaft (see, e.g., driveshaft 320 as shown in FIG. 5), such as generally along the longitudinal axis L of the vehicle. One or more beams 432 (e.g., at least two beams) of the second set of beams 430 are arcuate, curving away from and/or around a portion of the differential 414.

In some embodiments, the first set of beams 426 further includes a subset of one or more beams 434 (e.g., at least two beams) extending between two of the beams 432 of the second set of beams 430. The beams 434 of the subset have ends fastened to each of the two beams 432 of the second set of beams 430.

According to an exemplary embodiment, the skid plate 416 is bolted to the side plates 412 of the axle assembly 410. In some embodiments, the skid plate 416 includes flanges 436 (e.g., at least two flanges, at least four flanges) coupled to ends of beams of the array of beams 424, where the flanges 436 are configured to be fastened to the undercarriage of the vehicle (e.g., directly fastened to the side plates 412). In some embodiments, the flanges 436 (e.g., at least two flanges, at least four flanges) include apertures for bolting the skid plate 416 to the undercarriage. In some embodiments, at least two of the flanges 436 are coupled to (e.g., extending from, welded to, formed in) ends of beams of the first set of beams 426.

Still referring to FIGS. 6-7, open space 442 is defined between the beams of the array of beams 424 of the skid plate 416. During operational use of the axle assembly 410, blast energy from a landmine or IED may travel through the open space 442 between the beams of the skid plate 416, around the differential 414, and then may be directed away from the vehicle by the hull.

In some embodiments, the area defined by the open space 442 exceeds the area covered by the array of beams 424 of the skid plate 416, when viewed in a direction orthogonal to a plane defined by longitudinal and transverse axes L, T of the vehicle (e.g., in a vertically upward or downward direction; into or out of FIG. 7). Put differently, the area defined by a projection of the array of beams 424 onto a plane defined by longitudinal and transverse axes L, T of the vehicle is less than the area defined by a projection of the open space 442 between the beams of the array of beams 424 onto the plane. As such, the open space through which blast energy, from a detonation under the vehicle, may travel is wider than the surfaces that would catch such blast energy.

Without wishing to be bound by any particular theory, it is believed that the above-described arrangements of the array of beams 424 of the skid plate 416 balance protection of the undercarriage of the vehicle (e.g., differential 414) from ground obstacles with providing sufficient open space through which a landmine or IED blast may travel through (e.g., past, around) the skid plate 416 to the be mitigated by the vehicle hull, without excessively lifting the vehicle. As such, the skid plate 416 may allow an explosive blast to pass therethrough more easily than the skid plate 322 formed from the tray, in FIG. 5.

Figure 10:
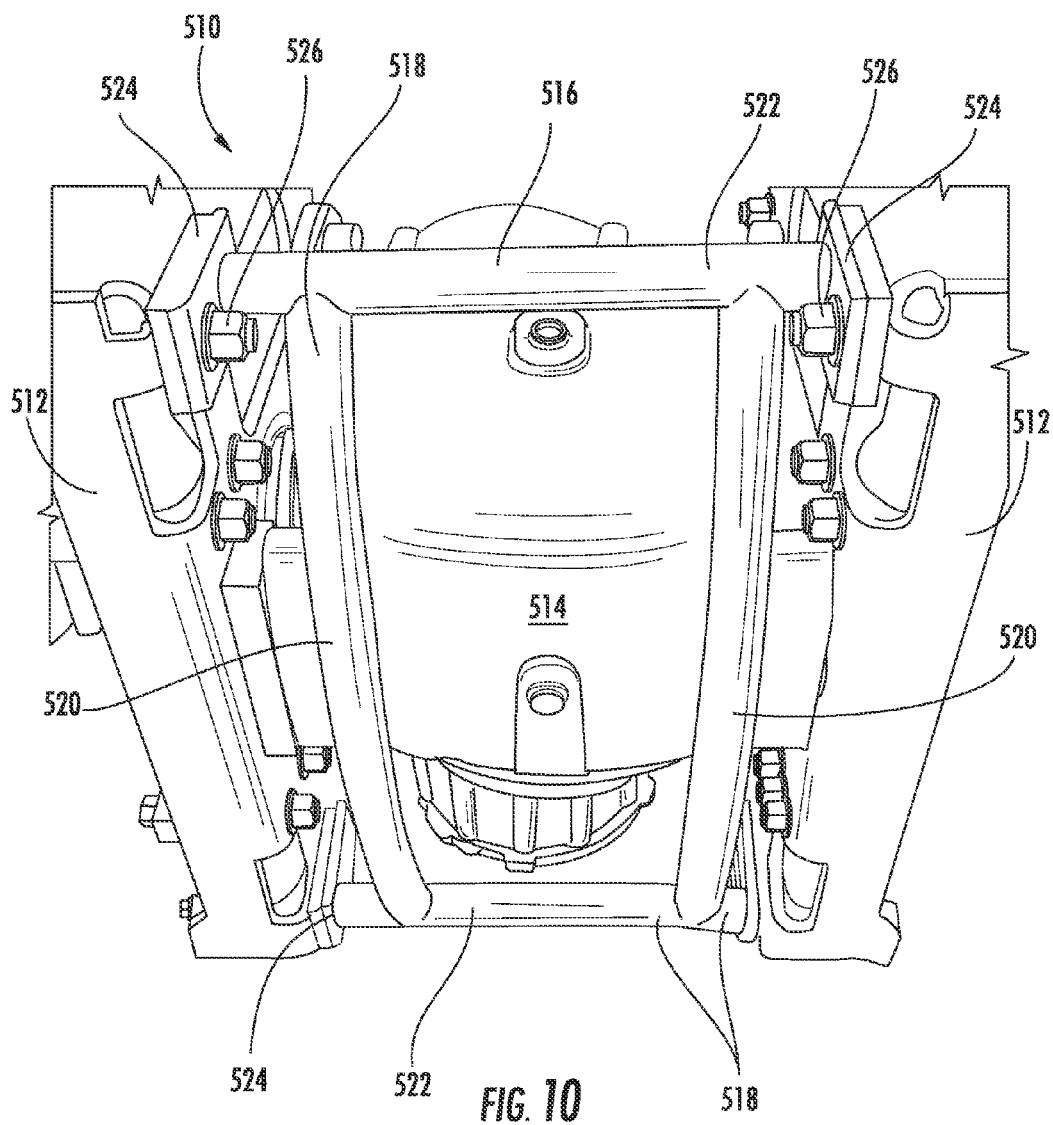
FIG. 10 is a perspective view of a skid plate and differential of an axle assembly according to an exemplary embodiment.

Referring to FIG. 10, an axle system 510 includes side plates 512, a differential 514, and a skid plate 516. The skid plate 516 is formed from at least four interconnected beams 518. A first two 520 of the beams 518 are curved (e.g., arcuate), and generally extend along parallel planes. A second two 522 of the beams 518 are generally straight, extending in a direction orthogonal to the parallel planes. The second two beams 522 include flanges 524 coupled to ends thereof, where the flanges 524 include apertures through which fasteners 526 may be inserted for fastening the skid plate 516 to the side plates 512. The first two beams 520 include ends fastened to sides of the second two beams 522.

Figure 11:
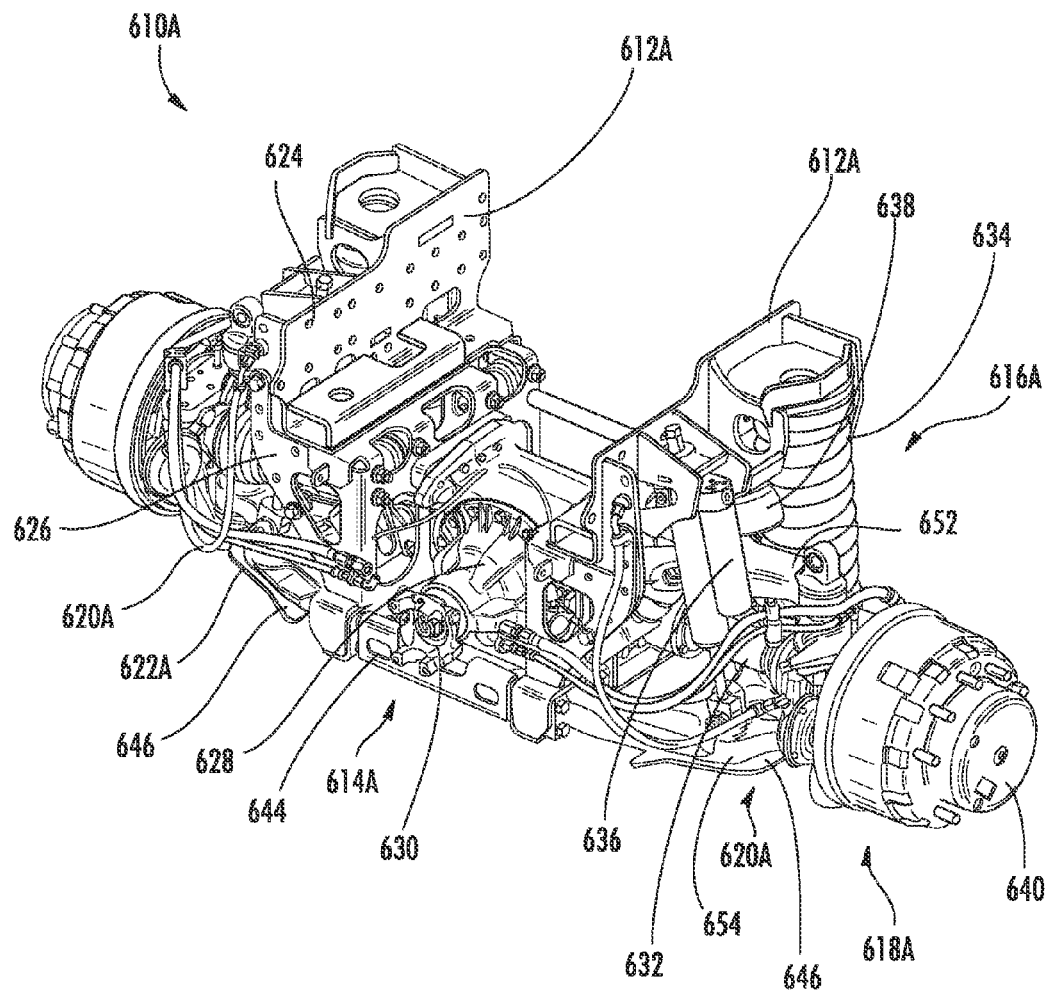
FIG. 11 is a perspective view of a front axle assembly according to an exemplary embodiment.

Referring now to FIG. 11, a front axle assembly 610A includes side plates 612A (e.g., subframe structure), a portion of a drive train 614A, suspension components 616A, wheel-end components 618A, plumbing 620A, and shielding 622A. The side plates 612A each include an upper portion 624 bolted to a lower portion 626. The drive train 614A includes a differential 628 having a coupling 630 configured to receive a driveshaft (see, e.g., driveshaft 320 as shown in FIG. 5). The differential 628 transfers the rotational motion of the driveshaft to two half shafts 632 extending from the differential 628, which each connect to the wheel-end components 618A.

Figure 12:
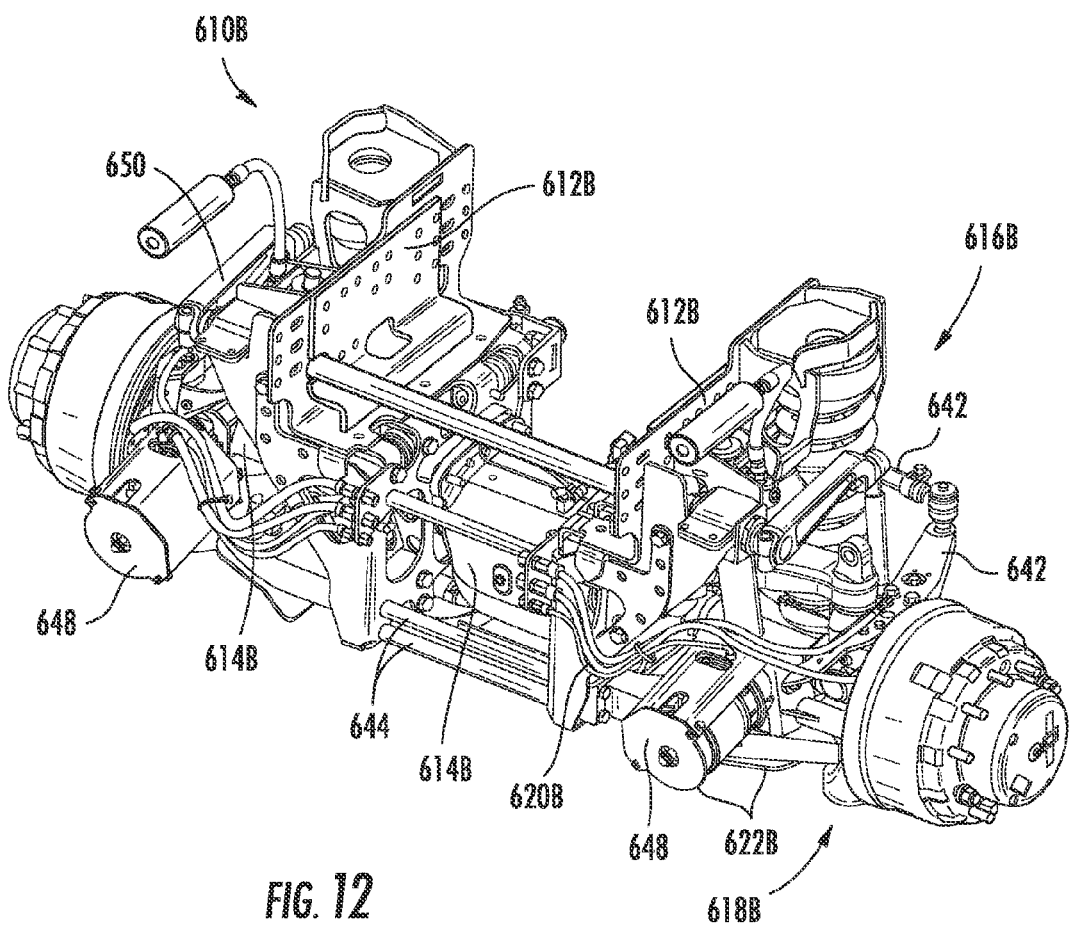
FIG. 12 is a perspective view of a rear axle assembly according to an exemplary embodiment.

Still referring to FIG. 11, the suspension components 616A include control arms 652, 654, spring members 634 (e.g., coil spring), dampers 636 (e.g., shock absorbers), and bumpers 638 (e.g., end stops). The wheel-end components 618A include a hub 640 and steering components 642 (FIG. 12). In some embodiments, the wheel-end components 618A additionally include brake components and a planetary gear reduction. The plumbing 620A may be used to supply fluid (e.g., hydraulic fluid, coolant, gas, water, fuel, etc.) to support braking and cooling functions of the vehicle system, among other functions. The shielding 622A includes a skid guard 644, lower control arm shields 646, and canister shields 648 (FIG. 12).

Referring to FIG. 12, a rear axle assembly 610B is configured to be used on a vehicle employing the front axle assembly 610A (FIG. 11). The rear axle assembly 610B includes side plates 612B, a portion of a drive train 614B, suspension components 616B, wheel-end components 618B, plumbing 620B, and shielding 622B. The rear axle assembly 610B further includes an anti-sway bar assembly 650, which may also be present in the front axle assembly 610A.

Figure 21:
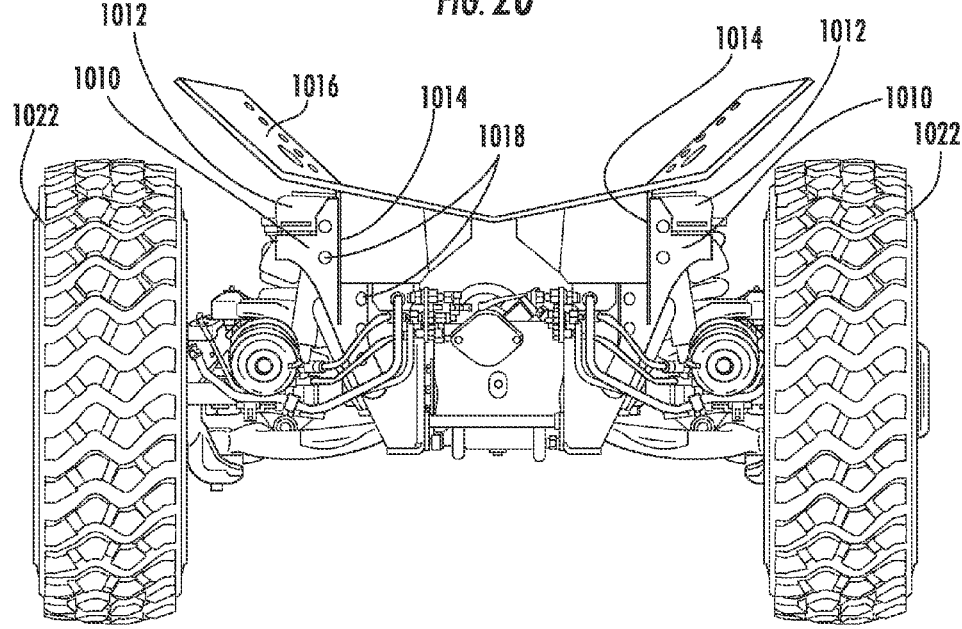
FIG. 21 is a front view of the axle assembly of FIG. 20 in a second configuration.

Referring to FIGS. 13-16 an axle assembly 710 includes wheel-end components 712, steering components 714 (FIGS. 13-14), drive train components 716 (FIGS. 13-14), suspension components 718 (FIGS. 14-16), and shielding 720. The wheel-end components 712 include a hub 722 configured to support a wheel for a vehicle (see, e.g., wheel 1022 as shown in FIG. 21). The steering components 714 include a control rod 724 for moving a steering arm 726 coupled to the hub 722. The drive train 716 components include a differential 728 (FIG. 14) rotatably coupled to a half shaft 730 (FIGS. 13-14) for rotating the hub 722. The suspension components 718 include a shock absorber 732 (FIG. 15), a lower control arm 734, and a spring member 736 (FIGS. 14-16).

Figure 13:
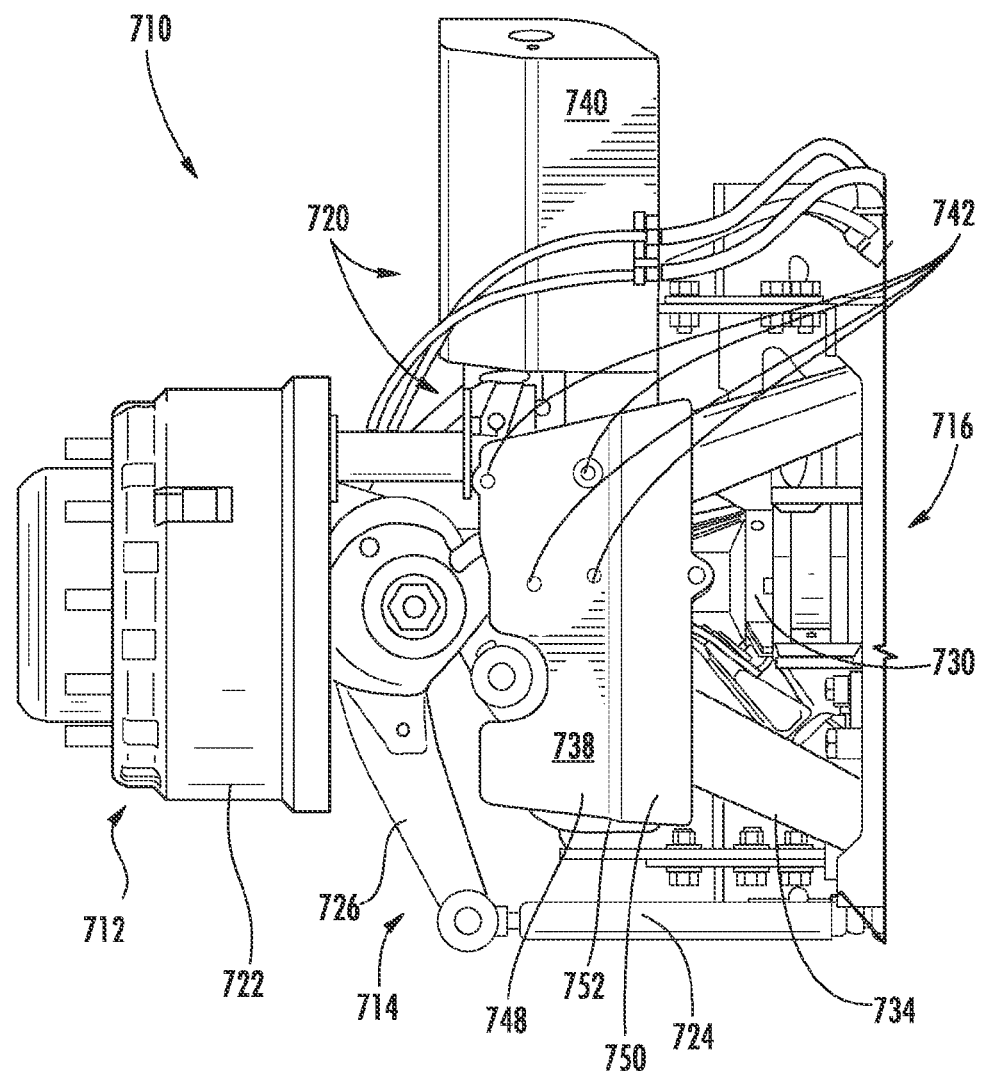
FIG. 13 is a bottom view of a first portion of an axle assembly according to an exemplary embodiment.

The shielding 720 for the axle assembly 710 includes a skid plate 754 (FIG. 15), a shield 740 (FIG. 13) for a canister, and a shield 738 (e.g., guard, deflector plate, plating, barrier) coupled to the lower control arm 734. Referring to FIG. 13, the shield 738 of the lower control arm 734 is fastened below the lower control arm 734 with fastening members 742 (e.g., bolts, threaded fasteners, screws, welds, pins, etc.). In some embodiments, the shield 738 is reinforced by support structure 744 (FIGS. 14 and 16) (e.g., reinforcement structure, buttresses). According to an exemplary embodiment, the shield 738 includes a first flat surface 748 and a second flat surface 750 divided by a fold 752 (e.g. crease).

Referring now to FIG. 14, the second flat surface 750 of the shield 738 extends from and is angled downward relative to the first flat surface 748. The first and second flat surfaces 748, 750 have a relative angle A1 (FIGS. 14 and 16) therebetween of 45-degrees or less (e.g., 30-degrees or less, 15-degrees or less). In contemplated embodiments, the shield coupled to the lower control arm includes more than two flat surfaces, or a continuously curving surface, such as a concave surface.

As shown in FIG. 13, the shield 738 is generally rectangular or rhomboid in shape. In other contemplated embodiments, the shield is wider, narrower, longer, shorter, or otherwise contoured. In some embodiments, the shield 738 is formed from steel or another metal, and is at least a quarter inch thick (e.g., at least a half inch thick, at least an inch thick) or has lesser thickness. In some embodiments the shield may be integrally formed with the lower control arm, or may be separately formed and attached (e.g., welded, glued, etc.) thereto.

Referring to FIGS. 15-16, without wishing to be bound by any particular theory, it is believed that during a blast event occurring below the lower control arm 734, that at least a portion of the blast force will be caught by the shield 738. The portion of the blast force will then transferred through the shield 738 to the lower control arm 734. An additional portion of the blast force will be caught by surfaces of the lower control arm 734. The lower control arm 734 will then be lifted upward, compressing the spring member 736 and a shock absorber 732, which then controllably contain and dissipate the portion of the blast force.

Figure 17:
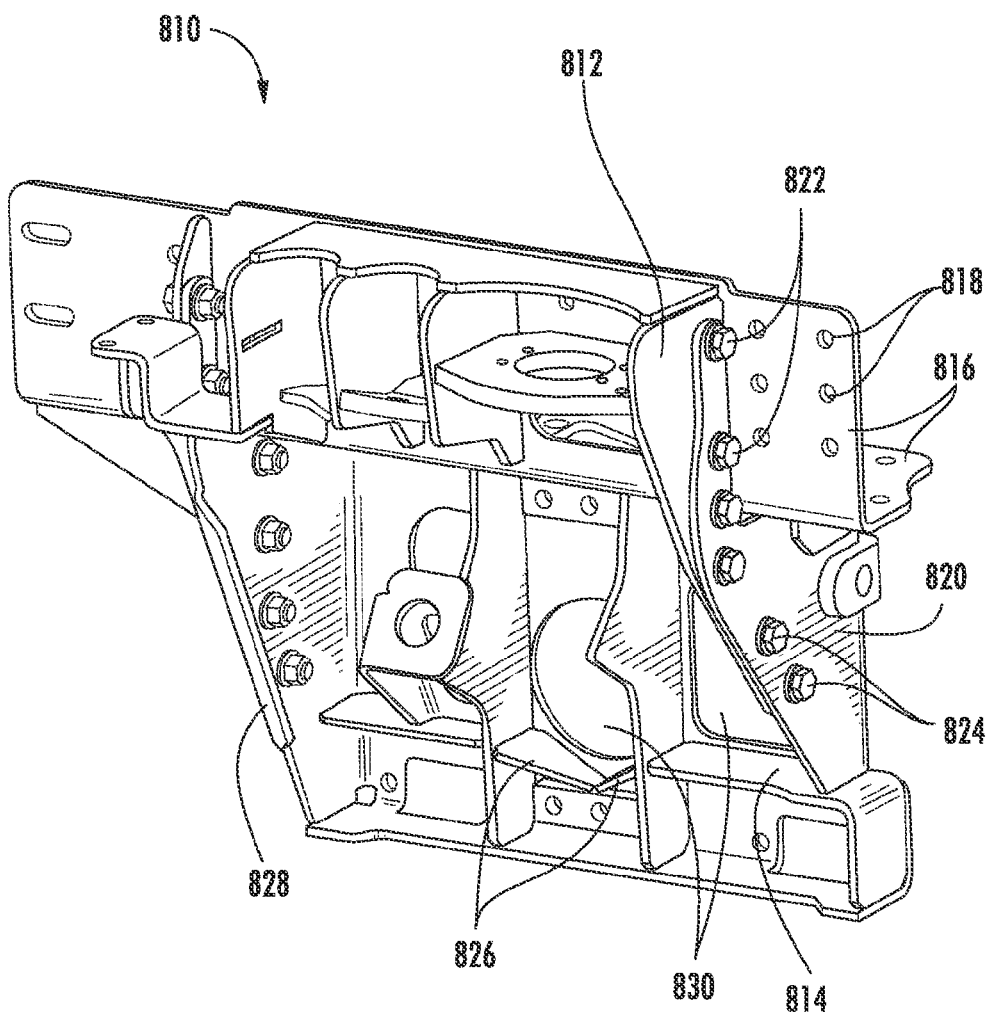
FIG. 17 is a perspective view of a side plate of an axle assembly according to an exemplary embodiment.

As shown in FIG. 17, a side plate 810 of an axle assembly includes parts 812, 814 (e.g., two parts, at least two parts) fastened together. The first part 812 includes surfaces 816 (e.g., seat, mounting surface) to which a hull (see, e.g., hull 212 as shown in FIGS. 2-4) of a vehicle may be attached. According to an exemplary embodiment, the surfaces 816 (e.g., two surfaces) are oriented at a right angle relative to each other (e.g., forming a seat), which is believed by the Applicants to provide a connection able to absorb shear forces from an explosive blast. The surfaces 816 include mounting holes 818 for fastening the hull to the side plate 810. The second part 814 of the side plate 810 is configured to support components of a suspension system, including hydraulic lines, a shock absorber, brakes, steering linkages, and other components.

According to an exemplary embodiment, the first part 812 of the side plate 810 may be fastened to the second part 814 by a connecting plate 820. According to such an exemplary embodiment, a portion of the connecting plate 820 is bolted or otherwise fastened to the first part 812 of the side plate 810, and another portion of the connecting plate 820 is bolted or otherwise fastened to the second part 814 of the side plate 810. In some embodiments, the connecting plate 820 may be integrally formed with either the first or second parts 812, 814, or may be separately formed and fastened thereto. For example, the connecting plate 820 may be welded to the second part 814 of the side plate 810, and bolted to the first part 812 of the side plate 810.

Still referring to FIG. 17, the connecting plate 820 includes bolts 822, 824 extending through the mounting holes for bolting the connecting plate 820 to the first and second parts 812, 814 of the side plate 810. For example, the connecting plate 820 may include bolts 822 (e.g., at least two, three, more than three) through the first part 812 of the side plate 810 and additional bolts 824 (e.g., at least two, three, more than three) through the second part 814 of the side plate 810.

According to an exemplary embodiment, the bolts 822, 824 may be selected (i.e., material, size, treatment, etc.) to purposefully shear (e.g., sever, break, unfasten) if a sufficient blast force (e.g., blast force of a predetermined magnitude) is provided below the axle assembly of the vehicle. Shearing of the bolts 822, 824 absorbs and dissipates energy from the blast. According to an exemplary embodiment, during operational use of the axle assembly, given a sufficient blast force, the bolts 822, 824 will shear before the hull (e.g., V-shaped hull) of the vehicle is penetrated.

The side plate 810 includes openings 830 (e.g., vents, apertures, holes, channels), which may be designed to allow an explosive blast to pass through the side plate 810 and be directed away by the vehicle hull. The openings 830 may be formed in low-stress areas of the side plate 810. In some embodiments, the openings 830 are positioned on the second part 814 of the side plate 810. In other embodiments, the side plate is a single, unitary body, and the openings are positioned on a lower half of the side plate, below the hull.

Still referring to FIG. 17, the side plate 810 may be designed with structure intended to provide a controlled crumple zone to absorb explosive energy of a blast. For example, a welded gusset 826 may be removed. A formed edge 828, for structural reinforcement of the side plate 810, may be removed. In some embodiments, openings 830, through which various components of the drive train and suspension system extend, may be enlarged to provide additional and larger openings.

Without wishing to be bound by any particular theory, it is believed that strategic removal and weakening of structural components may provide for a controlled deformation of the side plate 810. Such a deformation may be useful both for absorbing an initial blast of a land mine or IED and for absorbing an impact of a slamming down of the vehicle, such as if the vehicle has been lifted or thrown upward from the blast.

Figure 18:
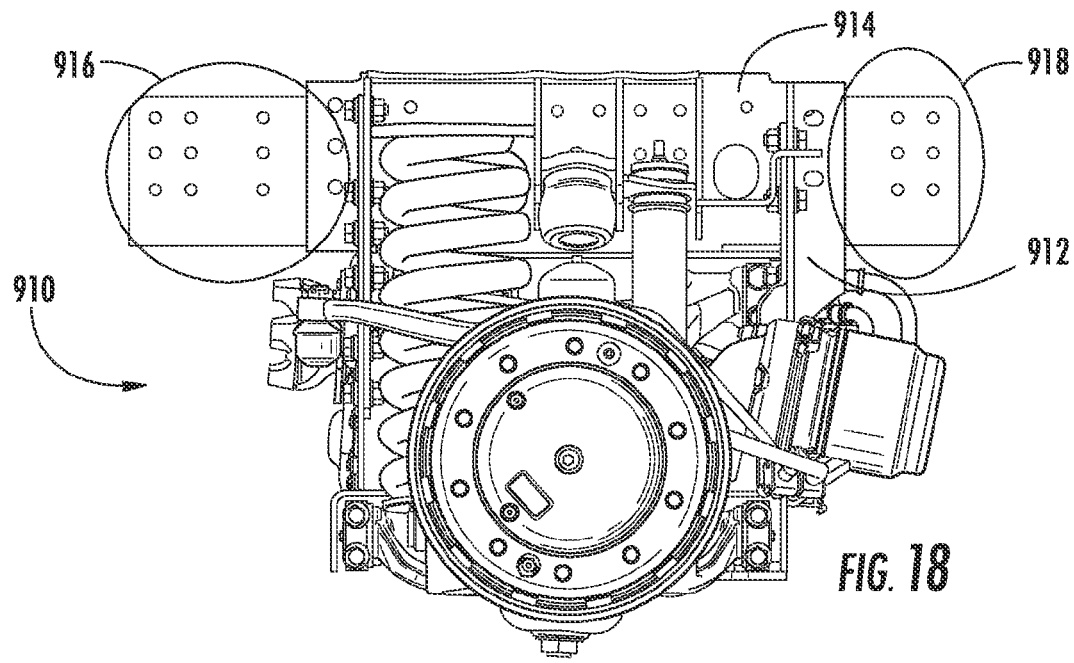
FIG. 18 is a side view of an axle assembly according to an exemplary embodiment.
Figure 19:
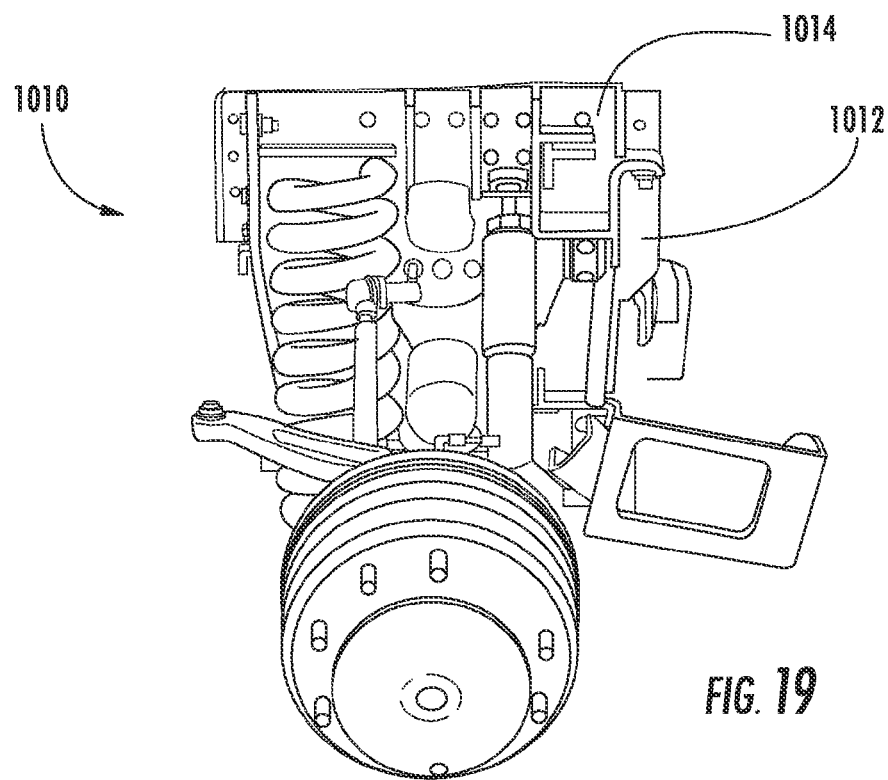
FIG. 19 is a side view of an axle assembly according to another exemplary embodiment.

Referring now to FIGS. 18-19, according to an exemplary embodiment, fastening surfaces 914 (FIG. 18) of a first part 912 of a side plate 910 have been narrowed in a longitudinal direction of the vehicle—as shown in FIG. 19, for example, in fastening surfaces 1014 of a first part 1012 of a side plate 1010. Forward and back portions 916, 918 of the fastening surfaces 914 of the side plate 910 may be removed.

Figure 20:
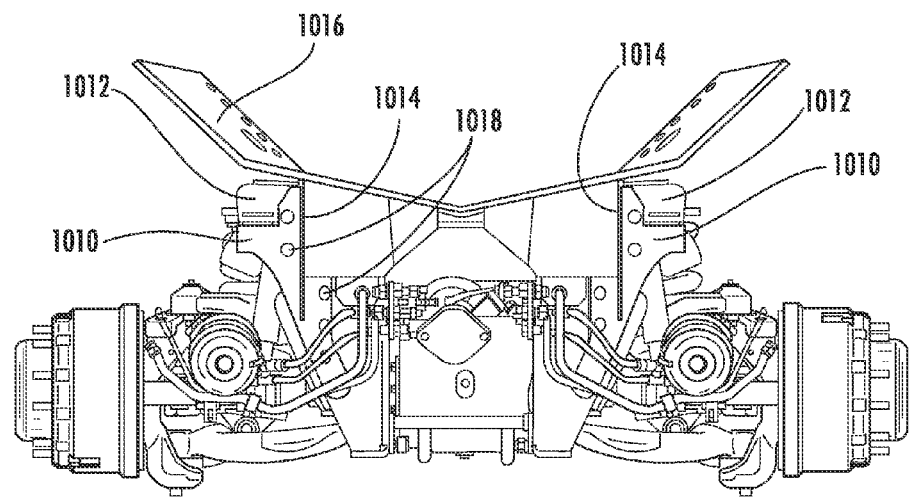
FIG. 20 is a front view of an axle assembly according to another exemplary embodiment in a first configuration.

Without wishing to be bound by any particular theory, it is believed that narrowing of the fastening surfaces 1014 of the side plates 1010 and inclusion of openings (see, e.g., openings 830 as shown in FIG. 17) in the side plate 1010, allow for blast forces to pass through and around the side plates 1010 as shown in FIGS. 20-21. The blast forces may be dissipated or redirected by a hull 1016 in a controlled manner, mitigating harm to the vehicle. Furthermore, shearing of the bolts 1018 between parts 1012, 1020 of the side plates 1010 and purposeful crumpling of the side plates 1010 (and/or other forms of controlled deformation) are believed to further absorb and dissipate explosive forces of a blast. Referring specifically to FIG. 21, wheels 1022 of the vehicle are positioned away from the hull 1016 (e.g., spaced apart by at least 6 in, at least 9 in, or at least 1 ft), allowing for a blast to pass by the wheels 1022. Features and innovations disclosed and described herein may be used individually in some embodiments, and together in other embodiments.

Figure 22:
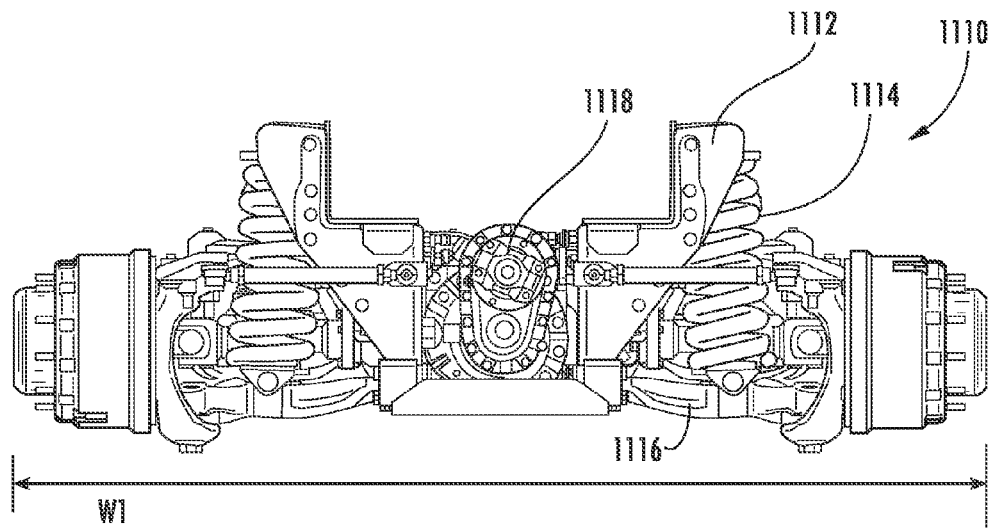
FIG. 22 is a front view of an axle assembly according to yet another exemplary embodiment in a first configuration.
Figure 23:
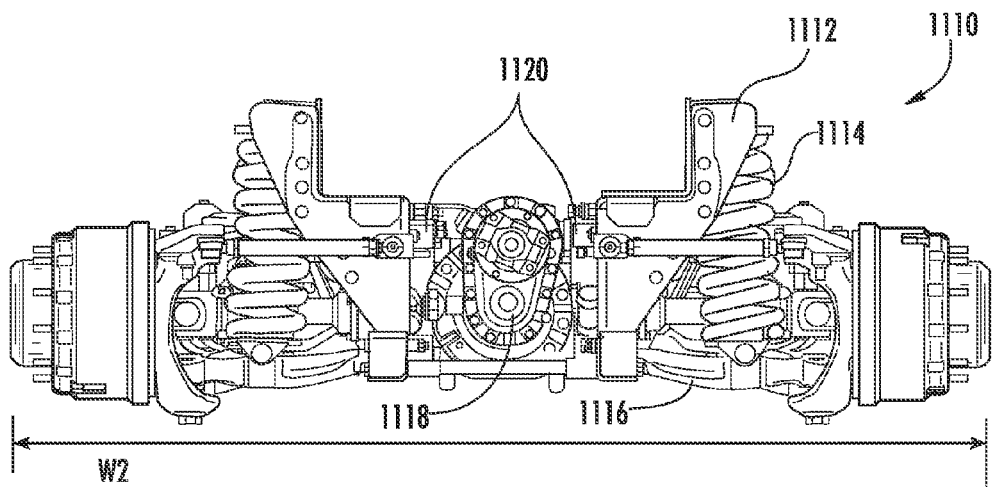
FIG. 23 is a front view of the axle assembly of FIG. 22 in a second configuration.
Figure 24:
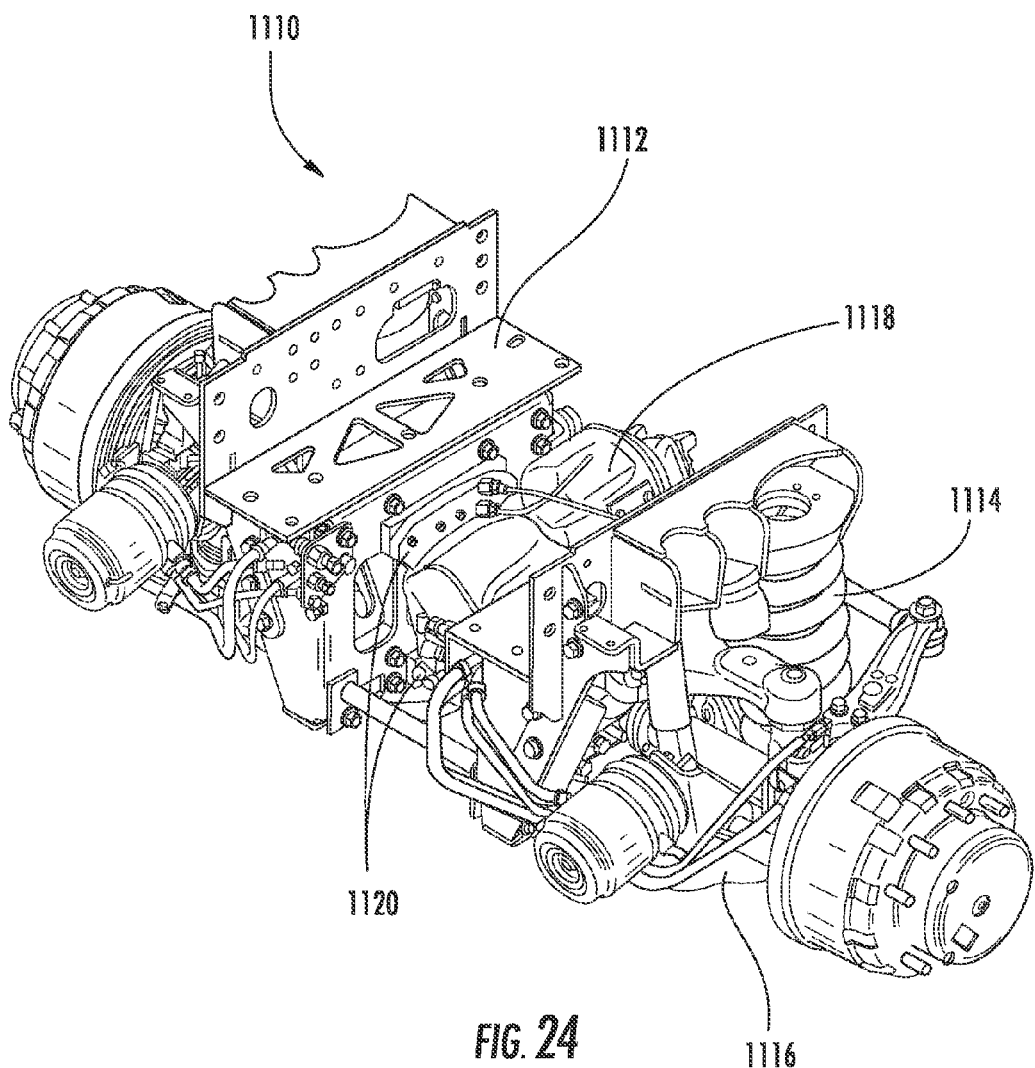
FIG. 24 is a perspective view of the axle assembly of FIG. 22 in the second configuration.

Referring now to FIGS. 22-24, an axle assembly 1110 includes a two-part side plate 1112 (see also side plate 810 as shown in FIG. 17), a spring member 1114, a lower control arm 1116, and other features. In a center of the axle assembly 1110, a differential 1118 is used to transfer power to wheels of a vehicle. In FIG. 22, the differential 1118 is mounted in a first configuration, such as tightly between in the side plates 1112. By contrast, in FIGS. 23-24 the differential 1118 is mounted in a second configuration having blocks 1120 (e.g., intermediate spacers, extensions) (see also FIGS. 6-8) positioned between the differential 1118 and the side plate 1112. The blocks 1120 may serve to widen the track width (i.e., length from wheel to wheel) of the vehicle from width W1 (FIG. 22) to width W2 (FIG. 23).

In other contemplated embodiments, the side plates have other forms, shapes, or configurations for coupling and controlling control arms and/or hull(s) (e.g., "side plate" positioned in front or behind differential). In still other embodiments, a vehicle axle does not include a transmission or differential, such as for a hybrid vehicle, but does include other features (e.g., skid guard, control arm shields) disclosed herein. The vehicle axle may be designed around a shaft coupled to a generator for regenerating braking energy.

According to an exemplary embodiment, the blocks 1120 are two-inch blocks positioned on each side of the differential 1118, between the differential 1118 and the side plates 1112, which increases the track width from the width W1 of about 82 to the width W2 of about 86 inches. In other embodiments, the blocks 1120 are otherwise sized, such as less than five inches wide, or wider than one inch. It is believed that widening of the track width and providing a paths (e.g., channels, vents, openings) may serve to improve blast dissipation characteristics of the axle assembly 1110 by providing space for blast energy to freely travel.

The construction and arrangements of the energy dissipation system for vehicle suspension, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An axle assembly of a vehicle, comprising:
   a side plate of a vehicle support structure;
   a wheel end assembly;
   a lower control arm extending between the side plate and the wheel end assembly;
   a spring member connected to the lower control arm and the side plate;
   a damper connected to the control arm and the side plate; and
   a shield fixed to the lower control arm and configured to at least partially protect the vehicle from an explosive blast originating below the vehicle, wherein the shield comprises:
      a first surface area configured to receive at least a portion of the blast such that energy of the blast is directed to the lower control arm, absorbed by the spring, and dissipated by the damper;
      a second surface area configured to direct at least a portion of the blast away from the vehicle in a direction transverse to the vehicle;
      wherein the first surface area and the second surface area are substantially planar and separated by a fold in the shield.

2. The axle assembly of claim 1, wherein a first line is defined by the first surface area and a transverse axis of the vehicle, wherein a second line is defined by the second surface area and the transverse axis of the vehicle, and wherein the lesser relative angle between the first and second lines is 45-degrees or less.

3. The axle assembly of claim 2, wherein the lesser relative angle between the first and second lines is 30-degrees or less.

4. The axle assembly of claim 1, wherein the shield comprises a plate bolted to the lower control arm.

5. The axle assembly of claim 4, wherein the plate is at least one-quarter of an inch thick and formed from steel.

6. The axle assembly of claim 5, wherein the shield further comprises a buttress extending between the lower control arm and the shield, supporting the second surface area of the shield.

7. A suspension system for an axle assembly of a vehicle, comprising:
   a lower control arm;
   a spring member coupled to the control arm;
   a damper coupled to the control arm; and
   a shield coupled to the lower control arm, the shield comprising:
      a first surface area configured to receive at least a portion of an explosive blast originating below the vehicle such that energy of the blast is directed to the lower control arm, absorbed by the spring, and dissipated by the damper,
      a second surface area configured to direct at least a portion of the blast away from the vehicle in a direction transverse to the vehicle, wherein the second surface area of the shield is angled downward and away from the lower control arm; and
      a buttress extending between the lower control arm and the shield, the buttress supporting the second surface area of the shield.

8. The suspension system of claim 7, wherein the damper is a shock absorber comprising a hydraulic cylinder, and wherein the spring member is a coil spring.

9. An axle assembly of a vehicle, comprising:
   a side plate of a vehicle support structure;
   a wheel end assembly;
   a lower control arm extending between the side plate and the wheel end assembly;
   a spring member connected to the lower control arm and the side plate;
   a damper connected to the control arm and the side plate; and
   a shield fixed to the lower control arm and configured to at least partially protect the vehicle from an explosive blast originating below the vehicle, wherein the shield comprises:
      a first surface area configured to receive at least a portion of the blast such that energy of the blast is directed to the lower control arm, absorbed by the spring, and dissipated by the damper;
      a second surface area configured to direct at least a portion of the blast away from the vehicle in a direction transverse to the vehicle, wherein the first surface area and the second surface area are substantially planar and separated by a fold in the shield; and
      a buttress extending between the lower control arm and the shield, the buttress supporting the second surface area of the shield.

10. The axle assembly of claim 9, wherein the shield further comprises a plate bolted to the lower control arm.

11. The axle assembly of claim 9, wherein the first surface area defines a first plane and the second surface area defines a second plane, and wherein the lesser relative angle between the first plane and the second plane is 45-degrees or less.

12. The axle assembly of claim 11, wherein the lesser relative angle between the first plane and the second plane is 30-degrees or less.

13. The suspension system of claim 9, wherein the damper is a shock absorber comprising a hydraulic cylinder, and wherein the spring member is a coil spring.

* * * * *